Sept. 3, 1940.  J. B. BRENNAN ET AL  2,213,237
METAL STENCIL
Filed Dec. 10, 1936  2 Sheets-Sheet 1

INVENTOR.
JOSEPH B. BRENNAN
Leona E. Marsh
By Richey + Watts
their ATTORNEYS.

Sept. 3, 1940.  J. B. BRENNAN ET AL  2,213,237
METAL STENCIL
Filed Dec. 10, 1936    2 Sheets-Sheet 2

INVENTOR.
JOSEPH B. BRENNAN
By Rickey & Watts
their ATTORNEYS.

Patented Sept. 3, 1940

2,213,237

UNITED STATES PATENT OFFICE 2,213,237

METAL STENCIL

Joseph B. Brennan and Leona E. Marsh, Fort Wayne, Ind.; said Marsh assignor to said Brennan Application December 10, 1936, Serial No. 115,208

2 Claims. (Cl. 101—127)

The purpose of this invention is to provide a permanent and relatively indestructible screen stencil for use in decorating various objects and materials such as sheet material and objects of irregular shape.

At present it is well known that silk and metal screens having a design attached thereto which is usually of a gelatinous or other easily destructible material are used for the stenciling of configurations on flat and irregular shapes either by machine methods or by manual operation.

It is intended by this invention to make a more durable and indestructible screen of metal for this purpose. The preferred method of attaining the object of this invention which is to make an all metal screen is to take a sheet of woven metal fabric and attach thereto a homogeneous layer of a metal other than that of which the screen is composed so that a unitary structure results consisting of the metal screen attached to the above mentioned dissimilar metallic layer.

We propose to use various means of accomplishing this object.

As an initial step a unitary sheet of metal screen and a layer of metal thereon or therein is constructed.

This may be accomplished by:

(a) Metal spraying with a metallizing gun so that the interstices of the metal screen are filled in and covered on one side or on both sides with a layer of metal dissimilar to that of which the screen is composed. Simultaneously with the spraying of this layer of dissimilar metal or subsequently thereto the resultant structure may be subjected to heat and or pressure so that a more closely knit and more flexible unitary structure results.

(b) A layer of aluminum foil may be secured to an iron screen by means of subjecting the foil to heat and rolling the two members together so that the aluminum foil adheres to the iron screen.

(c) A screen of Monel metal may be dipped in a molten bath of tin and while hot passed through rolls under pressure to secure the unitary structure.

(d) The metal screen may be immersed as a cathode in an electroplating bath and the interstices of the screen filled in with a layer of dissimilar metal. In case roughness and irregularity develops by this process before the interstices are completely filled in, the electrodeposition may be carried on to form a thicker layer than is needed and subsequently the rough unitary structure so produced may be polarized anodically and the high spots of the structure redeposited therefrom so that a smooth unitary structure results.

If preferred after the initial electrodeposition the rough unitary structure may be subjected to heat and passed through rolls under pressure so that the thickness and smoothness desired may be secured.

(e) A layer of copper plated iron or steel foil may be attached to one side of the screen of dissimilar metal such as Monel metal by means of so called hydrogen brazing, pressure being applied during the operation and the same being carried out in a non-oxidizing atmosphere.

Metals which we have used most successfully in making the above described unitary structure are Monel metal cloth of about one hundred and fifty mesh having wires about two thousandths of an inch in diameter attaching the layer of tin thereto by the above described means or filled in with a layer of tin by the above described means.

It will readily be understood that other metal combinations may be used than those listed above their selection being dependent upon the subsequent use for which the stencil is intended as well as upon the economy available.

In certain cases where it is desired to only have very small areas of a metallic screen filled in with metal such as lines and where it is desired to make a screen for covering almost all of a given area leaving only fine lines for configurations of the covered material exposed, the following procedure in making a screen might be preferred.

The screen is covered with a resist in the form of a configuration which may be applied thereto or by means of a screen stencil or by well known photographic processes where hardened gelatinous film remains on the screen to act as a blocking off resist for electrodeposition.

Thus a configuration of electroplating resist is produced on a screen by one of these methods and the metal is plated into the screen in the fine exposed configuration areas. It is generally preferable to block off the back of the screen in this process so that the metal is deposited only on one side.

This may be done by applying a layer of resistant material such as blocking off lacquer or a layer of asphalt to the reverse or back side of the screen.

The metallic screen may also be plated after first impregnating in the screen a carbonaceous rosin or paste insoluble in the plating solution and having sufficient carbon at its surface to produce a conductive surface.

The excess of this material is removed so that the top surface of the screen is exposed and the under surface of the screen is protected with a non-conductive wax coating. After plating, the material is removed by a solvent.

Referring to the drawings which accompany this specification:

Figures 2 and 3 are plan views of a metal screen;

Figure 8 is a plan view with a dissimilar metal 2 applied to the metal screen of Figure 2 by means of hydrogen brazing or other fusing methods.

Figures 1, 7:
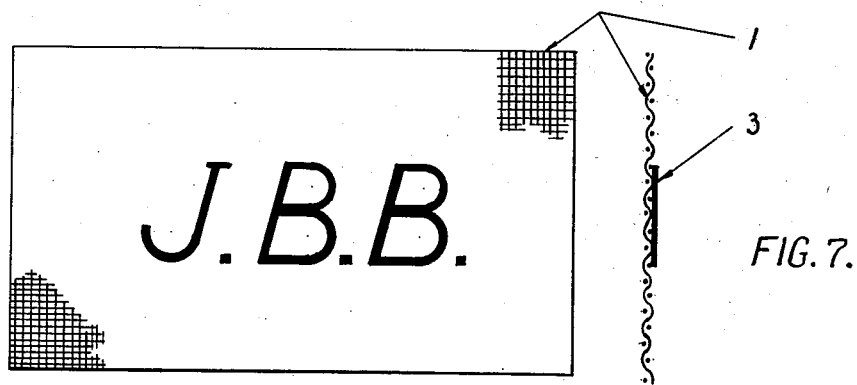
Figure 1 is a plan view of the invention illustrating an unitary structure after it has been etched leaving only the configurations 3.
Figures 7, 9, 10, 11 and 12 are sectional views of Figures 1, 3, 4, 5 and 6 respectively.
Figures 2, 8:
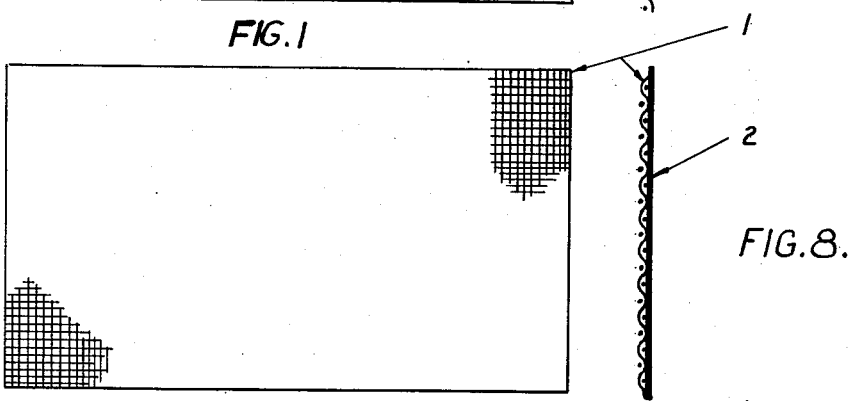
Figures 3, 9:
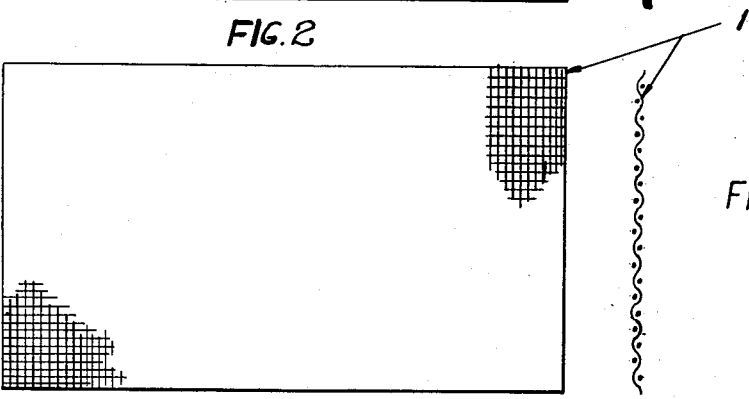
Figure 3 illustrates a metal screen 1.
Figure 4:
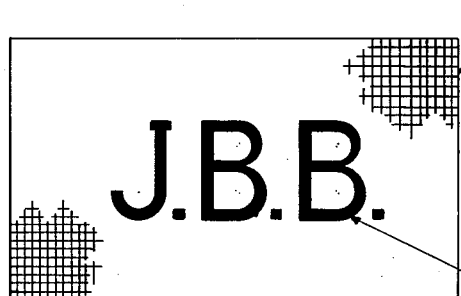
Figure 4 is a plan view illustrating a type of unitary structure after part of the embedded metal has been etched therefrom leaving the configuration 4.
Figure 10:
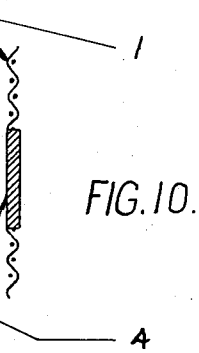
Figure 5:
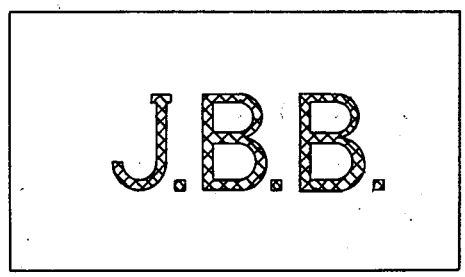
Figure 5 is a plan view illustrating the unitary structure etched in reverse from that shown in Figure 4, and leaving the configurations 6 and the embedded metal 7.
Figure 11:
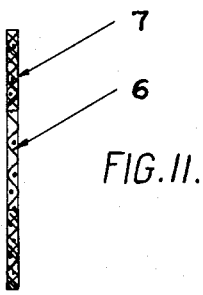
Figure 6:
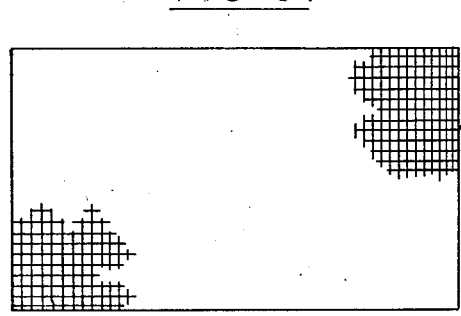
Figure 6 is a plan view illustrating the metal screen wherein a metal has been embedded into the mesh of said screen so that the screen is impregnated therewith.
Figure 12:
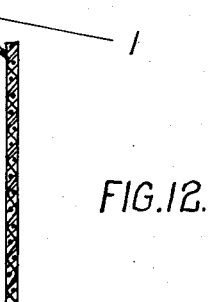

Referring to Figure 2, the metal layer 2 may have superimposed thereon a sand blast resisting layer into which a design may be cut with a stencil cutting knife in a form of a configuration and the part so cut removed therefrom and abrasion methods may be used to remove that portion of the metallic layer 2 exposed by this procedure. This abrasion which is preferably carried out by blasting with sand or other abrasive materials must only be carried to such an extent that the surface metal 2 where exposed is eaten through and the screen 1 Figure 2 underlying the surface metal 2 is not injured.

This however, is not our preferred method of accomplishing our objective since we believe the etching proposed can generally best be carried out by chemical means described hereafter rather than by mechanical means.

We found that the use of a metallic salt which is lower in the electrochemical series than the metal which it is desired to displace is practical. Thus where it is desired to etch aluminum or tin which has been superimposed on or embedded in Monel metal, we find it desirable to use the following proportions:

Per liter of water
Muriatic acid_____cc__ 150
CuSO₄ _____gm__ 30

The etching bath may be agitated to facilitate and speed up the process and also may be heated.

After a smooth flat sheet of dissimilar metals made into a unitary structure by the above procedure is available, an outline in wax or other etching resistant material is superimposed on this unitary structure by various well known means among which may be noted the following:

A layer of wax is produced upon the unitary metallic structure by immersion or brushing or spraying or by means of a stencil.

Another method of producing this etchant resistant design is by applying an etchant resistant photo-sensitive layer to one side of the unitary metallic structure and exposing same through a negative and washing out the unexposed area of said photo-sensitive etchant resistant layer with a solvent with the result that the exposed area remains and is resistant to the action of the subsequently used etching materials.

Another method of producing a design on the unitary metallic structure suitable for etching is to apply a layer of waxed fibrous sheet such as paper to the unitary metallic structure by means of an adhesive or by means of heat and pressure. Subsequently the desired configuration is cut out in this layer of waxed paper and the cut out portions removed therefrom and the desired exposed area is left on the unitary metallic structure.

Another method of securing the desired configuration on one side of the unitary metallic structure is to apply a layer of wax thereto and subsequently engrave out the desired configuration by means of an engraving machine or by manual engraving.

Another method of producing an etchant resistant configuration on the unitary metallic structure is to superimpose a layer of asphaltic solution on the unitary metallic structure and then superimpose thereon a layer of acid resisting sheet material such as lead foil so that the asphaltic solution produces adhesion of the lead foil to the unitary metallic structure and subsequently cutting out the desired configuration in the lead foil and removing the cut out portions therefrom.

In the above manner a composite sheet of material consisting of the unitary metallic structure referred to above is produced having an etching resistant configuration superimposed thereon. The other exposed areas such as the back and edges of the unitary metallic sheet may be then covered with the etchant resistant material which it is desired to use.

As an etching solution one must select those materials which are most suitable considering the metal of which a screen is composed and also the metal which it is desired to remove by etching therefrom.

Thus if Monel metal screen is used and filled in with tin, it is preferable to use a copper sulphate and muriatic acid solution removing the tin by means of displacement. This solution works also very well with a Monel metal screen to which aluminum is attached or in which aluminum has been embedded.

Electrolysis may be used in etching where desirable. For instance, the etching of aluminum covered or filled screen may be accomplished by using a salt solution such as a solution of two percent sodium chloride in water and applying from three to ten volts thereto. The screen metal in this case must be carefully observed so that no metal of the screen itself is plated therefrom.

It may be desirable in certain cases where it is desireable to have only small configurations of metal left on the screen after etching to fill in or cover only a sufficient area of the metal screen with a metal to assure an adequately sized area after etching, subsequently applying the resist configuration to these smaller areas and etching thereafter.

In case steel foil is applied by means of hydrogen brazing to a Monel screen, copper chloride solution of about 15 percent may be used as an etchant.

In decorating the surface of a hollow article it is with present known processes difficult to secure a material which will conform closely to the contour of the hollow article or irregular shaped object which it is desired to decorate or place a configuration on.

By our screen this difficulty may be overcome by first shaping in a die a screen to conform to the desired contour and then superimposing metal thereon or embedding metal therein and subsequently etching the configuration as above outlined or the unitary structure may be shaped in a die to conform to the contour of the object and subsequently etched.

In any case, it is much easier to secure and to make a screen which will conform to surfaces which are not plane when the screen is a unitary metal structure.

Another method of making a screen for imprinting configurations on irregular objects is to have certain sections of the screen shaped to conform to the desired contour and to have pieces of metal forming a framework attached to these sections.

Thus a hollow screen can be built up to conform to the desired contour of shaped pieces of the unitary structure which have been etched.

Reference is hereby made to our copending applications Serial No. 175,240, filed November 18, 1937; Serial No. 268,570, filed April 18, 1939; and Serial No. 280,132, filed June 20, 1939.

Having thus described our invention, what we claim is:

1. A metallic screen stencil plate adapted to have a design etched therein comprising a metallic screen having another metal embedded in the interstices thereof throughout substantially the entire area of the design to be etched on the plate, the characteristics of the metals being such that the embedded metal can be dissolved out of the interstices of the screen without destroying the screen.

2. A screen stencil plate adapted to have a design etched therein and comprising a thin sheet of aluminum having one substantially smooth surface and having a screen composed of a different metal embedded in the other surface thereof.

LEONA E. MARSH.
JOSEPH B. BRENNAN.